(12) United States Patent
Michi et al.

(10) Patent No.: US 7,117,077 B2
(45) Date of Patent: Oct. 3, 2006

(54) SPEED CONTROL WITH STOP FUNCTION

(75) Inventors: Harald Michi, Oelbronn-Duerrn (DE); Michael Scherl, Bietigheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/494,431

(22) PCT Filed: Oct. 3, 2002

(86) PCT No.: PCT/DE02/04041

§ 371 (c)(1),
(2), (4) Date: Apr. 25, 2005

(87) PCT Pub. No.: WO03/039902

PCT Pub. Date: May 15, 2003

(65) Prior Publication Data

US 2005/0228569 A1    Oct. 13, 2005

(30) Foreign Application Priority Data

Nov. 9, 2001    (DE) .............................. 101 55 096

(51) Int. Cl.
*B60K 31/00* (2006.01)
(52) U.S. Cl. .............................. 701/96; 701/70; 342/71
(58) Field of Classification Search .................. None
See application file for complete search history.

(56) References Cited

U.S. PATENT DOCUMENTS 6,370,471 B1 * 4/2002 Lohner et al. ................ 701/96
6,560,525 B1 * 5/2003 Joyce et al. ................... 701/96
6,820,709 B1 * 11/2004 Zimmermann et al. ..... 180/169

FOREIGN PATENT DOCUMENTS

| DE | 198 33 645 | 1/2000 |
| DE | 199 58 520 | 6/2001 |
| WO | WO02/076781 | * 10/2002 |

OTHER PUBLICATIONS

"Adaptive Cruise Control Systems—Aspects and Development Trends," by Winner, Witte, Uhler and Lichtenberg, Robert Bosch GmbH, in SAE Technical Papers Series 961010, International Congress and Exposition, Detroit, Feb. 26-29, 1996.

* cited by examiner

*Primary Examiner*—Michael J. Zanelli
(74) *Attorney, Agent, or Firm*—Kenyon & Kenyon LLP

(57) ABSTRACT

Cruise control system for motor vehicles is provided, which control system has a sensor device for measuring the vehicle's performance characteristics and for measuring the distance to a target ahead of the vehicle, a controller to control the vehicle's speed or acceleration as a function of the measured performance characteristics and distance data, and an input device for a shut-off command to shut off the controller. The control system also has a shut-off function to shut off the controller as a function of other operational commands from the driver, and the controller has a stop function for automatically braking the vehicle to a standstill. The input device for the shut-off command is deactivated if the stop function is active and the vehicle is stationary.

6 Claims, 2 Drawing Sheets

SPEED CONTROL WITH STOP FUNCTION

FIELD OF THE INVENTION

The present invention relates to a cruise control system for motor vehicles, which system has a sensor device to measure the vehicle's performance characteristics and to measure the distance to a target located in front of the vehicle, a controller to control the vehicle's speed or acceleration as a function of the measured performance characteristics and distance data, and an input device for a shut-off command to shut off the controller, as well as having a shut-off function to shut off the controller as a function of other operational commands from the driver.

BACKGROUND INFORMATION

A cruise control system makes it possible to set the vehicle's speed to a desired level selected by the driver. If the sensor device for the vehicle incorporates a distance sensor, for example in the form of a radar sensor, a stereo camera system or the like, the vehicle speed can also be set in such a way that a suitable safety distance to a vehicle ahead is automatically maintained. The input device for the shut-off command, which may, for example, take the form of a control button on the steering wheel or dashboard, allows the driver to deactivate various control functions. Other operational commands from the driver, e.g., pressing the brake pedal, have the effect of deactivating the control functions.

An example of a cruise control system, which is also known as an ACC (Adaptive Cruise Control) system, is described in "Adaptive Cruise Control Systems—Aspects and Development Trends," by Winner, Witte, Uhler and Lichtenberg, Robert Bosch GmbH, in SAE Technical Papers Series 961010, International Congress and Exposition, Detroit, Feb. 26–29, 1996. Since the available sensor devices do not yet permit complete coverage and safe evaluation of the traffic environment, at present such systems are primarily suitable for relatively stable traffic situations, such as driving on a highway or expressway. In urban traffic, or when driving at low speeds on winding roads, however, the uncertainties in detecting the particular relevant target object could create a risk of accident. For this reason, known ACC systems are designed in such a way that they can be activated only above a certain threshold speed.

Some systems attempt to expand the range of application of the ACC system to the traffic situation described as "stop-and-go," which occurs, for example, in a traffic jam or in slow-moving traffic. This traffic situation, too, is relatively stable and is therefore suitable for automatic distance control. However, the functionality has to be expanded in such way that stopping and preferably also starting may be controlled automatically. On vehicles having automatic transmission, this may be achieved by means of accelerator and brake control signals, which have the same effect as the driver's pressing the accelerator pedal or brake pedal. However, it must be ensured that road safety is not jeopardized by vehicle responses which the driver is not expecting.

An object of the present invention is to provide a cruise control system which makes it possible to automatically brake the vehicle to a standstill and to hold the vehicle in stationary position without jeopardizing road safety.

SUMMARY

The above object is achieved according to the present invention through a controller having a stop function for automatic braking of the vehicle to a standstill and through an input device for inputting a shut-off command, which input device is deactivated while the stop function is active and the vehicle is stationary.

In a traffic jam, the driver may activate the stop function so that the controlled vehicle is automatically braked to a standstill as soon as the vehicle immediately ahead of it stops. In this process, the controller automatically applies the vehicle's brake and keeps it applied so that the vehicle does not begin to roll after coming to a halt. Thus, in contrast with conventional vehicles having automatic transmissions, the driver does not need to keep a foot on the brake pedal. This results in a great increase in convenience and in road safety.

However, in the absence of additional safety precautions, in this situation there would be a risk that the driver might shut off the cruise control system by simply pressing a button, without considering that the brake would then no longer be automatically applied and that the vehicle would unintentionally begin to roll. This risk is avoided according to the present invention by the feature that the input device for the shut-off command is automatically rendered ineffective whenever the stop function is active and the vehicle is stationary. At a standstill, then, the stop function may only be deactivated by a different operational command from the driver, such as pressing the brake pedal, setting the hand brake or placing the selector lever of the automatic transmission in Neutral or Park.

It is advantageous if the controller not only implements a stop function, but also a stop-and-go function which in stop-and-go traffic automatically controls not only stopping but also restarting and slow forward rolling of the vehicle as a function of the distance to the target. The operational commands which activate the stop function or the stop-and-go function when the vehicle is at a standstill may also include the action of the driver pressing the accelerator. Normally, with an ACC system, pressing the accelerator does not automatically shut off the cruise control but only temporarily overrides it. When the driver releases the accelerator again, cruise control automatically resumes on the basis of the former desired speed or the former required distance to the vehicle ahead. Basically, this overriding action using the accelerator is also possible within the stop-and-go function. If, however, the driver presses the accelerator while the vehicle is stationary, it is highly likely that the driver does not wish to continue the stop-and-go operation but instead, for example, wishes to pull rapidly out of the line of vehicles. Consequently, in this situation it is useful to also interpret pressing of the accelerator as an operational command to shut off the stop-and-go function. This will not jeopardize road safety, since a driver pressing the accelerator in any event expects the vehicle to start to move.

DETAILED DESCRIPTION

Figure 1:
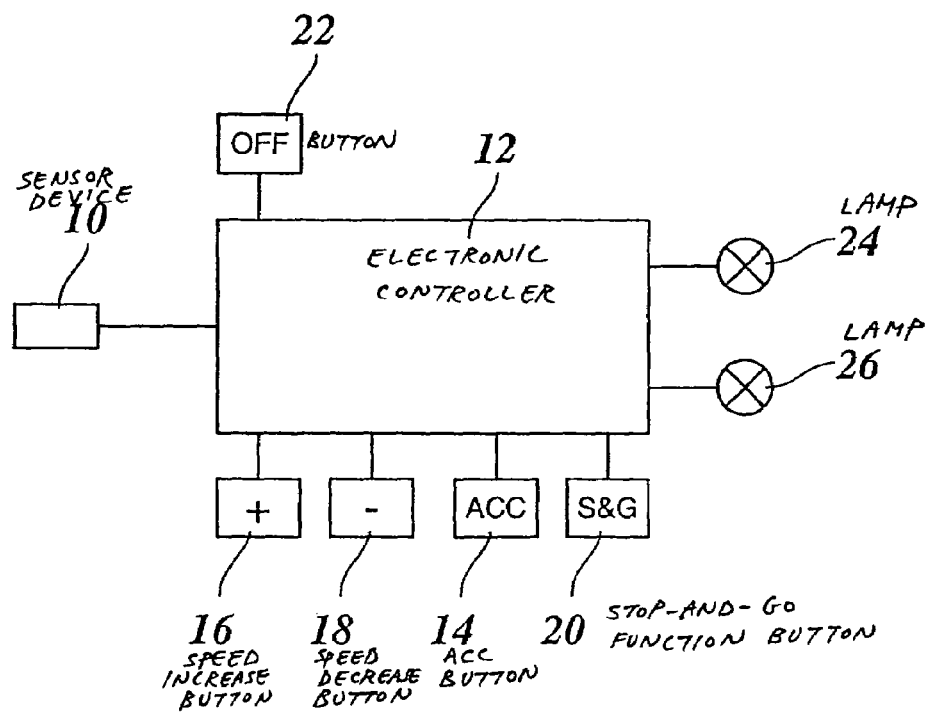
FIG. 1 shows a block diagram of a cruise control system and related operation and display components.

Since the basic design and mode of operation of a cruise control system having an ACC function are known, FIG. 1 shows only the major components of a cruise control system in a block diagram. A sensor device 10 incorporates a distance sensor, e.g., a radar sensor, which measures the distance to, and relative speed of, a vehicle ahead. If the radar sensor detects several targets, e.g., several vehicles or stationary targets such as road signs and the like, one target is selected, for example through a plausibility assessment.

Sensor device 10 may also include sensors of a known type, for example a driving speed sensor, acceleration sensors to detect both longitudinal and transverse acceleration, a yaw rate sensor and the like, which are normally present in the vehicle in any event and whose signals are also used for other control purposes. The signals from the distance sensor and the other sensors are evaluated in an electronic controller 12, which, for example, is a microcomputer. Controller 12 acts on the vehicle's propulsion and braking system in order to regulate the driving speed, e.g., to a desired speed selected by the driver or to a suitable distance to the vehicle ahead. This control function, which will be referred to below as the ACC function, is activated by the driver's pressing an ACC button 14. If a desired speed has already been stored, pressing the ACC button causes control to be resumed at that desired speed. If not, the desired speed is set by the driver's briefly pressing a button 16 once the vehicle has reached the desired speed. Further pressing of button 16, or holding it, will cause a progressive increase in the desired speed. Similarly, pressing button 18 will cause a progressive decrease in the desired speed.

The ACC function switches off automatically as soon as the speed of the vehicle drops below a specified level $V_1$, for example 40 km/h. As soon as the speed drops below a higher level $V_2$, for example 50 km/h, however, the driver may activate a stop-and-go function by pressing a button 20. The driver will make use of this function, for example, when he is approaching the end of a traffic jam. The stop-and-go function then causes the vehicle to be brought to a standstill automatically at a suitable distance to the end of the traffic jam. If the stopped vehicle ahead drives forward for a short distance, the stop-and-go function then causes the vehicle to start automatically and drive itself a short distance forward. In this process the speed of the vehicle is limited automatically to speed $V_2$, or to a lower desired speed selected by the driver using buttons 16 and 18. It should be noted here, however, that the desired speed cannot be selected to be lower than $V_1$.

By means of a button 22 (input device for shut-off command), the ACC function and also the stop-and-go function may be switched off.

Buttons 14, 16, 18 and 20 may also be integrated into a multi-function lever, which is located, for example, on the steering wheel. Alternatively or additionally, the commands may also be input by means of a voice recognition system.

Figure 2:
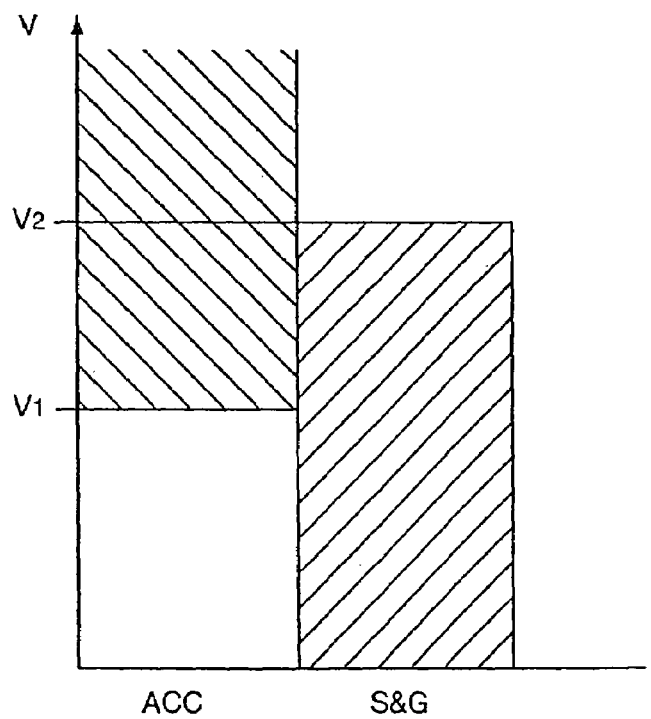
FIG. 2 shows a diagram of the speed ranges in which various functions of the cruise control system are usable.

FIG. 2 illustrates the speed ranges in which the ACC function and the stop-and-go function may be activated. In the range between $V_1$ and $V_2$ both functions may be activated, although they are mutually exclusive.

A lamp 24 (FIG. 1) lights up to indicate that the ACC function is active. This lamp 24 has an intermediate status between "on" and "off." This intermediate status may be, for example, that the lamp lights up less brightly, or changes color, or that only a segment around the lamp lights up, indicating that the ACC function is ready for activation but not active. Similarly, if lamp 26 lights up or assumes an intermediate status, this indicates that the stop-and-go function is active or ready for activation. By pressing the accelerator the driver may override either the ACC function or the stop-and-go function, in order to accelerate temporarily to a higher speed. However, pressing the brake pedal, or pressing button 22, will cause the cruise control system to be deactivated. If the driver himself has braked the vehicle to a standstill, the stop-and-go function cannot be activated from a stationary condition, but only after the driver himself has set the vehicle in motion again by pressing the accelerator. Switching the stop-and-go function back on again in such a case requires that the driver actively press button 20. As an example, it should be assumed in the following text that the vehicle in which the cruise control system is installed has an automatic transmission. Controller 12 may then act on the vehicle's power system by way of an accelerator control signal which has the same function as the driver pressing the accelerator pedal. Similarly, intervention in the braking system results from a braking control signal that has the same effect as the driver pressing the brake pedal. If the stop-and-go function is active and the vehicle is braked to a standstill, the accelerator control signal is initially cancelled in order to allow the vehicle to coast to a stop, and finally the brake control signal is output in order to bring the vehicle to a complete standstill. When the vehicle is stationary, the brake control signal is maintained, so that the vehicle does not begin to roll again.

Figure 3:
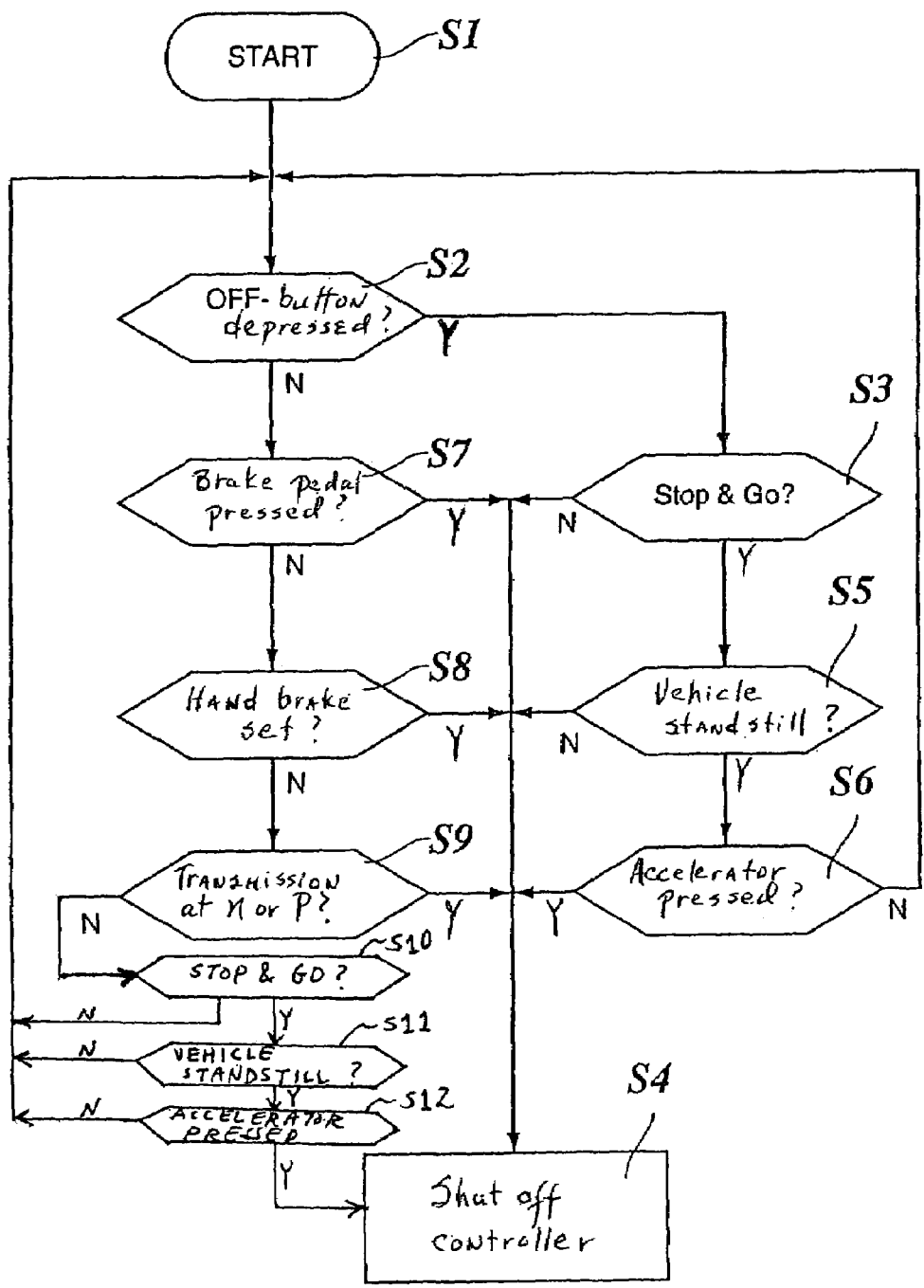
FIG. 3 shows a flowchart of a program which is implemented in the cruise control system according to the present invention.

A program implemented in controller 12 periodically, for example at intervals of the order of magnitude of a few milliseconds, interrogates whether one of buttons 14, 16, 18, 20, or 22 has been pressed or whether the driver has input another operational command, e.g., by pressing the accelerator pedal or brake pedal or by moving the transmission selector lever. FIG. 3 is a flowchart illustrating some main parts of the control program according to the present invention. In particular, this program stipulates under what conditions the stop-and-go function may be switched off. Here it should be noted that the result of switching off the stop-and-go function when the vehicle is stationary is that the brake control signal drops out and thus the vehicle begins to roll. In order to prevent a dangerous situation or an irritation for the driver, switching off of the stop-and-go function using button 22 (OFF button) is allowed only under certain conditions, as will be explained below.

The program is started in step S1 shown in FIG. 3, which program interrogates periodically the operating commands input by the driver either by pushing a button or by pressing a pedal. Step S2 checks whether OFF button 22 was pressed in the preceding interrogation cycle.

If this is the case, step S3 checks whether the stop-and-go function is active. If the stop-and-go function is not active, this means that the ACC function is active. In that case the vehicle is in motion and its speed is at least $V_1$. Pressing OFF button 22 therefore means that the driver wishes to resume control of the vehicle himself and there is no hindrance to switching off the control function.

Consequently, the program branches to step S4, and the ACC function is switched off. The cruise control system, however, remains in a standby state, in which commands from buttons continue to be interrogated. Provided that the vehicle speed permits this, it is possible for the ACC function or the stop-and-go function to be activated again by means of buttons 14, 20. This is indicated by the intermediate status of lamps 24, 26.

If step S3 has determined that the stop-and-go function is active, step S5 checks again whether the vehicle is stationary. Only if the vehicle is still in motion is the stop-and-go function switched off in step S4. If the vehicle is stationary, step S6 interrogates once again whether the driver has pressed the accelerator. By pressing the accelerator the driver indicates that he wishes to resume control of the vehicle and that he anticipates that it will start to move. Consequently, in this case the stop-and-go function is switched off in step S4. If, however, the driver has not pressed the accelerator the program jumps back from step S6 to step S2. This means that when the vehicle is stationary and the accelerator is not pressed, pushing of the OFF button 22 is ignored. This prevents the vehicle from starting to roll because the driver has unmindfully pushed the OFF button.

If step S2 has determined that OFF button 22 was not pressed, step S7 investigates whether the driver has pressed the brake pedal. If the brake pedal has been pressed, the program branches in any event to step S4 and the control function (i.e. the ACC function or the stop-and-go function) is switched off.

If the driver has not pressed the brake pedal, step S8 checks whether the driver has set the hand brake. Setting the hand brake too causes the control function to be switched off in step S4.

If the hand brake has not been set, step S9 finally checks whether the driver has placed the selector lever of the automatic transmission either in Neutral (N) or in Park (P). If this is the case, there is no danger that the vehicle will start to roll unexpectedly, and the control function is switched off in step S4.

If this is not the case, steps S10, S11 and S12 follow, carrying out the same interrogations as in steps S3, S5 and S6. If the results of these interrogations are negative, the program jumps back to step S2 and the interrogation cycle is repeated. If, however, the stop-and-go function is active, the vehicle is stationary and step S12 determined that the accelerator was pressed, the control system is switched off in step S4. This makes it possible for the driver to set the vehicle in motion again simply by pressing the accelerator, without having to press the OFF button.

The result is to ensure that with the vehicle stationary the stop-and-go function may be switched off only by pressing the accelerator or the brake pedal, setting the hand brake or moving the transmission selector lever, but not simply by pressing the OFF button 22.

In a modified exemplary embodiment, rather than checking for the vehicle's being stationary, step S5 may also interrogate for a more general condition, for example the condition that the controller is outputting the brake control signal or that the function "Brake to a standstill" has been triggered in the controller. In this case the pressing of OFF button 22 during stop-and-go operation is blocked not only once the vehicle is actually stationary but earlier, once it is about to come to a standstill.

What is claimed is:

1. A cruise control system for a motor vehicle, comprising:
   a sensor device for measuring the vehicle's performance characteristics and the distance to a target ahead of the vehicle;
   a controller for controlling at least one of the vehicle's speed and acceleration as a function of the measured performance characteristics and the distance to the target, wherein the controller has a stop function for automatically braking the vehicle to a standstill; and
   an input device for inputting a shut-off command to shut off the controller, wherein the shut-off function to shut off the controller is also triggered by at least one of selected operational commands from the driver other than an activation of the input device, and wherein the input device for the shut-off command is deactivated if the stop function of the controller is active and the vehicle is stationary.

2. The cruise control system according to claim 1, wherein the stop function of the controller is a part of a stop-and-go function for automatic control of the vehicle's stopping and starting as a function of the distance to the target.

3. The cruise control system according to claim 1, wherein one of the selected operational commands from the driver to trigger the shut-off function is pressing of a brake pedal.

4. The cruise control system according to claim 1, wherein one of the selected operational commands from the driver to trigger the shut-off function is setting of a hand brake.

5. The cruise control system according to claim 1, wherein the vehicle has an automatic transmission and an automatic-transmission selector lever, and wherein one of the selected operational commands from the driver to trigger the shut-off function is moving the automatic-transmission selector lever to a position other than a position for driving forward.

6. The cruise control system according to claim 1, wherein the stop function of the controller is switched off by the driver's pressing the accelerator when the vehicle is stationary.

* * * * *